United States Patent
Yasukawa (10) Patent No.: US 10,992,825 B2
(45) Date of Patent: Apr. 27, 2021

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Takuma Yasukawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/443,513

(22) Filed: Jun. 17, 2019

(65) Prior Publication Data
US 2019/0394340 A1    Dec. 26, 2019

(30) Foreign Application Priority Data
Jun. 21, 2018 (JP) .............................. JP2018-117603

(51) Int. Cl.
*H04N 1/00* (2006.01)
*G06F 11/07* (2006.01)
*H04N 1/21* (2006.01)

(52) U.S. Cl.
CPC ..... *H04N 1/00084* (2013.01); *G06F 11/0727* (2013.01); *G06F 11/0733* (2013.01); *G06F 11/0751* (2013.01); *G06F 11/0793* (2013.01); *H04N 1/00037* (2013.01); *H04N 1/21* (2013.01); *H04N 2201/0094* (2013.01)

(58) Field of Classification Search
CPC .. H04N 1/00084; H04N 1/00037; H04N 1/21; H04N 2201/0094; G06F 11/0727; G06F 11/0751; G06F 11/0793; G06F 11/0733

USPC .......................................................... 358/1.14
See application file for complete search history.

(56) References Cited

U.S. PATENT DOCUMENTS

| | | | |
|---|---|---|---|
| 5,177,621 A * | 1/1993 | Ohtaki | H04N 1/00002 358/405 |
| 6,282,687 B1 * | 8/2001 | Maeda | H04N 1/00002 714/763 |
| 2009/0091779 A1 * | 4/2009 | Ishinaga | B41J 3/543 358/1.15 |
| 2013/0182025 A1 * | 7/2013 | Yanaka | B41J 2/04541 347/10 |

(Continued)

FOREIGN PATENT DOCUMENTS

| JP | 2006-33239 A | 2/2006 |
|---|---|---|
| JP | 2016-18322 A | 2/2016 |

*Primary Examiner* — Allen H Nguyen
(74) *Attorney, Agent, or Firm* — Canon U.S.A., Inc. IP Division (57) ABSTRACT

According to some embodiments, an image forming apparatus includes at least one storage device, a detection unit, and a control unit. The at least one storage device is logically dividable into a plurality of storage areas each capable of construction of a file system. The detection unit detects an abnormal access to the storage device. The control unit, in response to detection of the abnormal access, performs, for a storage area in which the abnormal access is detected, a recovery action corresponding to the storage area. If the storage area in which the abnormal access is detected does not correspond to a predetermined storage area, the control unit checks and fixes the storage area as the recovery action for the storage area in which the abnormal access is detected.

19 Claims, 5 Drawing Sheets

(56) References Cited

U.S. PATENT DOCUMENTS

| | | | |
|---|---|---|---|
| 2015/0029537 A1* | 1/2015 | Goda | G06K 15/4055 |
| | | | 358/1.14 |
| 2017/0024168 A1* | 1/2017 | Tamura | H04N 1/00973 |
| 2017/0068595 A1* | 3/2017 | Nautiyal | G06F 11/10 |
| 2017/0337455 A1* | 11/2017 | Tao | G06K 15/408 |
| 2018/0207948 A1* | 7/2018 | Sheng | B41J 2/2103 |

* cited by examiner

| NUMBER | LABEL | USE | RECOVERY ACTION | |
|---|---|---|---|---|
| ... | ... | ... | ... | |
| 5 | /TMPDATA | TEMPORARY AREA | FORMAT | 411 |
| ... | ... | ... | ... | |
| 7 | /BOXDATA | BOX DATA AREA | CHECK AND FIX | 412 |
| ... | ... | ... | ... | |
| 10 | /APLDATA | APPLICATION AREA | CHECK AND FIX | 413 |
| ... | ... | ... | ... | |
| 12 | /OTRDATA | OTHER AREA | CHECK AND FIX | 414 |
| ... | ... | ... | ... | |
| | | | | |

IMAGE FORMING APPARATUS, METHOD FOR CONTROLLING IMAGE FORMING APPARATUS, AND STORAGE MEDIUM

BACKGROUND

Field

An embodiment of the disclosure relates to recovery control for a storage in an image forming apparatus.

Description of the Related Art

Some conventional image forming apparatuses have a storage device, such as a hard disk drive (HDD) or a solid state drive (SSD), as a storage device for holding user's image data and application data, and temporary data being processed. A storage is divided into units called partitions according to uses, and each partition is often managed using an appropriate file system.

In an image forming apparatus having a storage, data access abnormalities may occur in which data managed in the storage cannot be properly accessed.

Such data access abnormalities are caused by, for example, hardware-caused physical abnormalities such as faulty cable connection. Data access abnormalities is also caused by software-caused logical abnormalities, such as off-track, i.e., deviation of the read/write position on the hard disk due to vibrations, and file system inconsistency due to sudden shutdown during a write operation.

If such a data access abnormality is detected, support operation for the image forming apparatus is performed by a serviceperson as follows. An error notification is provided on a User Interface (UI) of the image forming apparatus or to a remote monitoring system. In response to the notification, a serviceperson visits the user and addresses the error. The serviceperson then tries to recover the storage by powering up the apparatus again, checking and fixing the file system of the relevant partition of the possibly faulty storage, or formatting the partition. As a measure in the case where the error still cannot be solved, the serviceperson replaces the hard disk.

Many of errors for which a serviceperson is called are actually errors caused by logical abnormalities, such as a collapse of partition management data called the MBR (Master Boot Record) or file system inconsistency. In such a case, the called serviceperson can solve the error simply by powering up the apparatus again or formatting the partition.

As a technique for solving such a logical abnormality in a storage, Japanese Patent Application Laid-Open No. 2006-33239 proposes a technique of automatically performing a clearing process upon detecting an abnormality, so that the location where the abnormality is detected is updated to "0."

Japanese Patent Application Laid-Open No. 2016-18322 proposes a technique of selectively formatting a partition according to the use of the partition, in order to avoid data loss caused by, e.g., automatically formatting the storage without a user's approval.

Note that, even for an error caused by a physical abnormality of a storage, the storage may temporarily be recovered by formatting a partition. As a measure taken in this case, a service person is first called to recover the storage by formatting the partition, and then called again to replace the hard disk when the next error notification is issued.

SUMMARY

According to some embodiments, an image forming apparatus includes at least one storage device, a detection unit, and a control unit. The at least one storage device is logically dividable into a plurality of storage areas each capable of construction of a file system. The detection unit detects an abnormal access to the storage device. The control unit, in response to detection of the abnormal access, performs, for a storage area in which the abnormal access is detected, a recovery action corresponding to the storage area. If the storage area in which the abnormal access is detected does not correspond to a predetermined storage area, the control unit checks and fixes the storage area as the recovery action for the storage area in which the abnormal access is detected.

Further features of the disclosure will become apparent from the following description of exemplary embodiments with reference to the attached drawings.

DESCRIPTION OF THE EMBODIMENTS

Preferred embodiments of the disclosure will now be described in detail in accordance with the accompanying drawings.

First Embodiment

Figure 1:
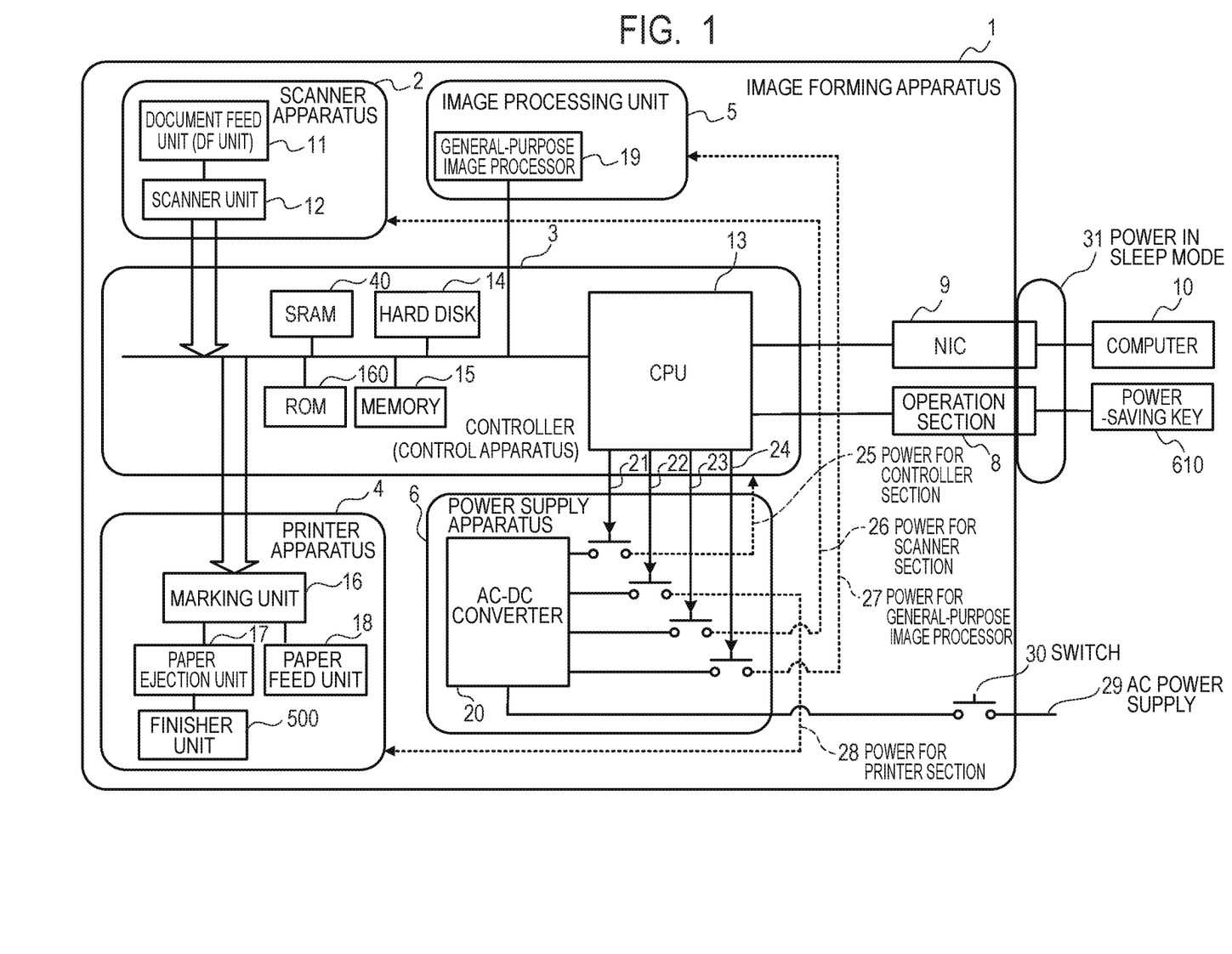
FIG. 1 is a diagram illustrating an example of a configuration of an image forming apparatus illustrating an embodiment.

FIG. 1 is a diagram illustrating an example of a configuration of an image forming apparatus 1 illustrating an embodiment of the disclosure.

As illustrated in FIG. 1, the image forming apparatus 1 has a scanner apparatus 2, a printer apparatus 4, an operation section 8, a Network Interface Card (NIC) 9, a hard disk 14 and a controller 3. The hard disk 14 may be provided inside the controller 3. Although a hard disk drive (HDD) is employed as a specific example of a storage device in the description of this embodiment, other storage devices such as a solid state drive (SSD) may be employed. The image forming apparatus 1 may include multiple storage devices, such as a combination of HDDs and SSDs.

The scanner apparatus 2 is an engine that optically reads an image from a document and converts the image into a digital image.

The printer apparatus 4 is an engine that outputs a digital image onto a paper device.

The operation section 8 is used for operating the image forming apparatus 1 and for providing display.

The NIC 9 is used for connecting to networks such as a Local Area Network (LAN). Using the NIC 9, the image forming apparatus 1 can, via the LAN, send and receive digital images to and from a computer 10 such as a Personal Computer (PC), receive jobs issued from the computer 10, receive instructions to the apparatus from the computer 10, and the like.

The hard disk 14 stores various sorts of data, digital images, control programs and the like.

The controller 3 is connected to the scanner apparatus 2, the printer apparatus 4, the operation section 8, the NIC 9 and the hard disk 14, and executes jobs in the image forming apparatus 1 by issuing instructions to each module.

The scanner apparatus 2 has a document feed unit 11 and a scanner unit 12. The document feed unit 11 can automatically and sequentially switch among batches of documents. The scanner unit 12 can optically scan a document and convert the document into a digital image. The scanner apparatus 2 sends the converted image data by using the document feed unit 11 and the scanner unit 12 to the controller 3.

The printer apparatus 4 has a paper feed unit 18, a marking unit 16, a paper ejection unit 17 and a finisher unit 500. The paper feed unit 18 can sequentially feed paper (sheets) one by one from a batch of paper. The marking unit 16 prints image data onto a paper being fed. The paper ejection unit 17 ejects the printed paper. The finisher unit 500 can subject the ejected paper to post-processing.

The controller 3 has a Central Processing Unit (CPU) 13 and is responsible for transfer of image data between the scanner apparatus 2 and the printer apparatus 4 and saving of image data. That is, the controller 3 temporarily saves image data received from the scanner apparatus 2 in a memory 15. The controller 3 then stores the image data in the hard disk 14, thereby completing image scanning and saving. Further, the controller 3 can temporarily save, in the memory 15, the image data stored in the hard disk 14 and send the image data from the memory 15 to the printer apparatus 4, thereby providing print output.

The image forming apparatus 1 has an image processing unit 5 that includes a general-purpose image processor 19. The controller 3 can subject image data saved in the memory 15 to image processing (for example, scaling down) in the general-purpose image processor 19 and save the processed image data back in the memory 15.

The controller 3 controls the operation section 8. The operation section 8 can display the states of jobs and the states of engines such as the scanner apparatus 2 and the printer apparatus 4. In the image forming apparatus 1, various jobs can be executed by the CPU 13 interpreting an operators operations from the operation section 8 or instructions received via the NIC 9 from the LAN. It is to be noted that the operation section 8 is connected to a power-saving key 610, via which the operation section 8 can receive a user's instruction to transition to or return from the power-saving state.

In the controller 3, a Static Random Access Memory (SRAM) 40 is nonvolatile memory that holds data such as user setting data. The SRAM 40 can persistently hold data even after the apparatus is powered off.

A Read Only Memory (ROM) 160 stores programs or instructions that, when executed by the CPU 13 in the controller 3, cause the CPU 13 to perform operations, or function as units, as described in the following. As with the SRAM 40, the ROM 160 can be used to hold setting values as well.

A power supply apparatus 6 is an apparatus that receives power from an AC power supply 29 and supplies the power for use in the image forming apparatus 1. When the power of the apparatus is off, the Alternating Current (AC) power supply 29 is insulated by a switch 30. Turning the switch 30 on causes AC power to be supplied from the AC power supply 29 to an Alternating Current-Direct Current (AC-DC) converter 20, in which Direct Current (DC) power is generated.

The image forming apparatus 1 can control power supply for the entire apparatus in four independent manners under instructions from the CPU 13. That is, a switch section 21 coupled to the CPU 13 can control turning on/off the power supply of the power for the controller section 25. Similarly, a switch section 22, a switch section 23 and a switch section 24 can control turning on/off the power supply of the power for the printer section 28, the power for the scanner section 26, and the power for the general-purpose image processor 27, respectively. The CPU 13 uses these switch section s 21 to 24 to appropriately supply power to locations requiring the power in the image forming apparatus 1.

Figure 2:
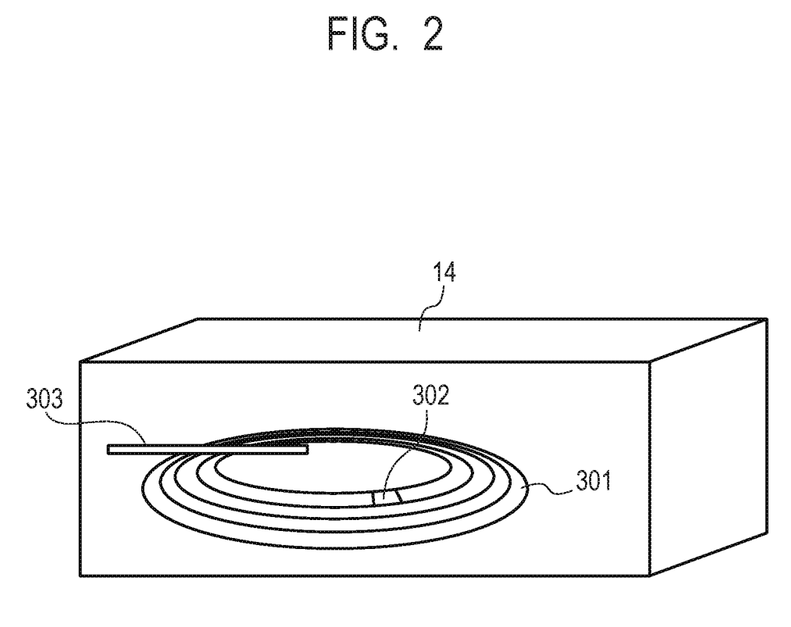
FIG. 2 is a diagram for describing a configuration of a hard disk.

FIG. 2 is a diagram for describing a configuration of the hard disk 14.

In the hard disk 14, a magnetic head 303 is moved to a sector 302 on a magnetic disk 301 to read data stored in the sector 302 or write data to the sector 302.

Data in a hard disk is often managed by constructing a file system supported by an OS (Operating System). If the file system is in a logically abnormal state, the data cannot be properly accessed even if the hard disk is not broken. This situation is caused by factors such as: deviation from the target sector of a read/write operation due to external vibrations or the temperature and humidity environment; or failure to properly complete writing to a sector due to sudden shutdown during the writing.

Figure 3:
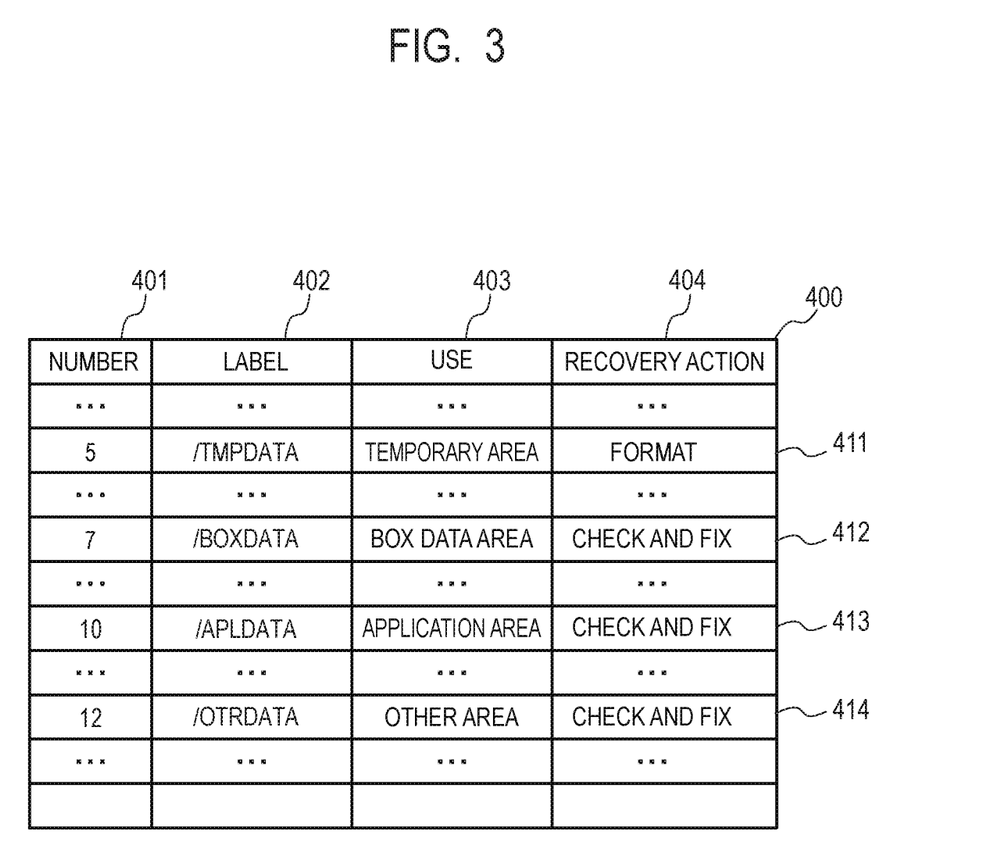
FIG. 3 is a diagram illustrating correspondences between the structure of partitions in the hard disk and recovery actions.

FIG. 3 is a diagram illustrating an example of correspondences between the structure of partitions in the hard disk 14 and recovery actions.

As illustrated in FIG. 3, a table 400 illustrating the correspondences between the structure of partitions and recovery actions includes the items of a partition number 401, a partition label 402, a use of partition 403 and a recovery action 404.

Partitions refer to storage areas resulting from logically dividing a storage device such as a hard disk. In each partition, each file system can be constructed to manage data. Also in each partition, initialization called formatting can be performed separately for the partition. Each partition has information such as the size as well as the partition number 401 and the partition label 402. It is to be noted that the use of partition 403 indicates the use of each partition in which data required for the operation of the image forming apparatus 1 is located.

The recovery action 404 indicates recovery actions that depend on the use of partition 403. Two types of recovery actions, "format" and "check and fix," are defined in the recovery action 404.

"Format" is an action corresponding to, although not limited to, the mkfs command in Linux® and the diskpart command in Windows®, for example. "Format" is defined for partitions containing data that can be initialized without the user's approval.

"Check and fix" is an action corresponding to, although not limited to, the fsck command in Linux® and the chkdsk command in Windows®, for example, and includes logically fixing a partition. "Check and fix" is defined for partitions that cannot be formatted without the user's approval.

Note that options specified for the above fsck and chkdsk commands are not particularly limited, but any option capable of checking and fixing a partition is applicable to the disclosure. It is to be noted that logically fixing a partition involves, for example, detecting inconsistency in at least one of the size of the file system, the number of Modes in the file system, the number of unused blocks, the number of unused inodes, and check of the file-system size and the inode-list size, and overwriting the detected inconsistent value with a proper value. Fixing a partition does not change the hierarchical structure of the file system or data held in the files but may change the management information about the file system. Then, the file system after the fixing does not need to be formatted or the like, and operation may be able to be continued without being substantially affected by the fixing. Thus, fixing is different from formatting of a file system, i.e., what is called logical formatting in which sectors written at the time of physical formatting are numbered.

A specific example of partitions will be described below.

A temporary area 411 is a partition for holding temporarily used data, such as a partition used by the image forming apparatus 1 to decompress compressed image data. "Format" is defined in the recovery action 404 for the temporary area 411.

A BOX data area 412 is a partition for holding data related to BOX functions, such as printing or transmitting a stored scanned image. "Check and fix" is defined in the recovery action 404 for the BOX data area 412.

An application area 413 is a partition for holding applications that the user installs later and can use. "Check and fix" is defined in the recovery action 404 for the application area 413.

An other area 414 is a partition for holding an executable program or a function license, for example. "Check and fix" is defined in the recovery action 404 for the other area 414.

In this embodiment, information as illustrated in FIG. 3 for example (including at least: information capable of identifying a partition, such as the partition number 401 or the label 402; and information about the use 403 or the recovery action 404) is stored in the SRAM 40 in advance. That is, a recovery action is preset for each partition in the hard disk 14. On the occurrence of an access error in the hard disk 14, the CPU 13 reads the above information from the SRAM 40 and performs the recovery action corresponding to the partition having the access error.

Figure 5:
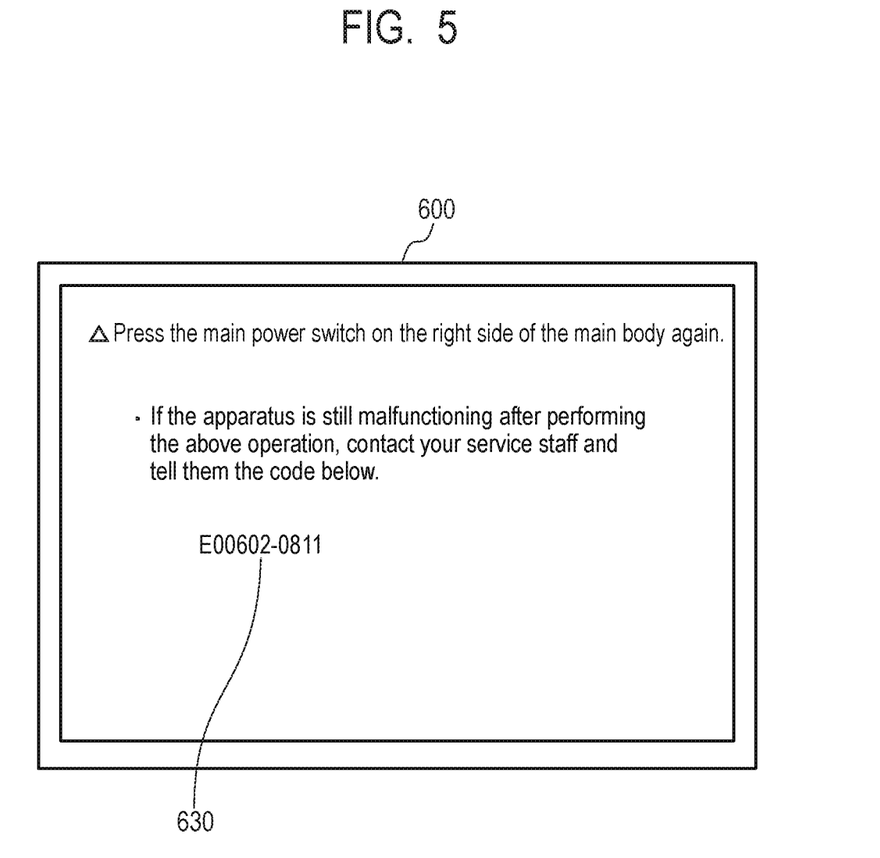
FIG. 5 is a diagram illustrating an example of display provided upon detection of a data access abnormality in the hard disk in the embodiment.

FIG. 5 is a diagram illustrating an example of display provided upon detection of a data access abnormality in the hard disk 14. This display is provided on a display section (a Liquid Crystal Display (LCD) 600) in the operation section 8.

Upon detecting an abnormal access to data in the hard disk 14, the controller 3 notifies the user of the occurrence of abnormality. Specifically, the controller 3 displays, on the LCD 600 in the operation section 8, a prompt to press the main power switch again, and an error code (630 in FIG. 5) indicating the area having the detected abnormality.

This display is provided because the detected data access abnormality may be due to a temporary cause and recovery may be performable by pressing the main power switch (the switch 30 in FIG. 1) again to restart the image forming apparatus 1.

A process flow in this embodiment will be described below with reference to a flowchart in FIG. 4.

Figure 4:
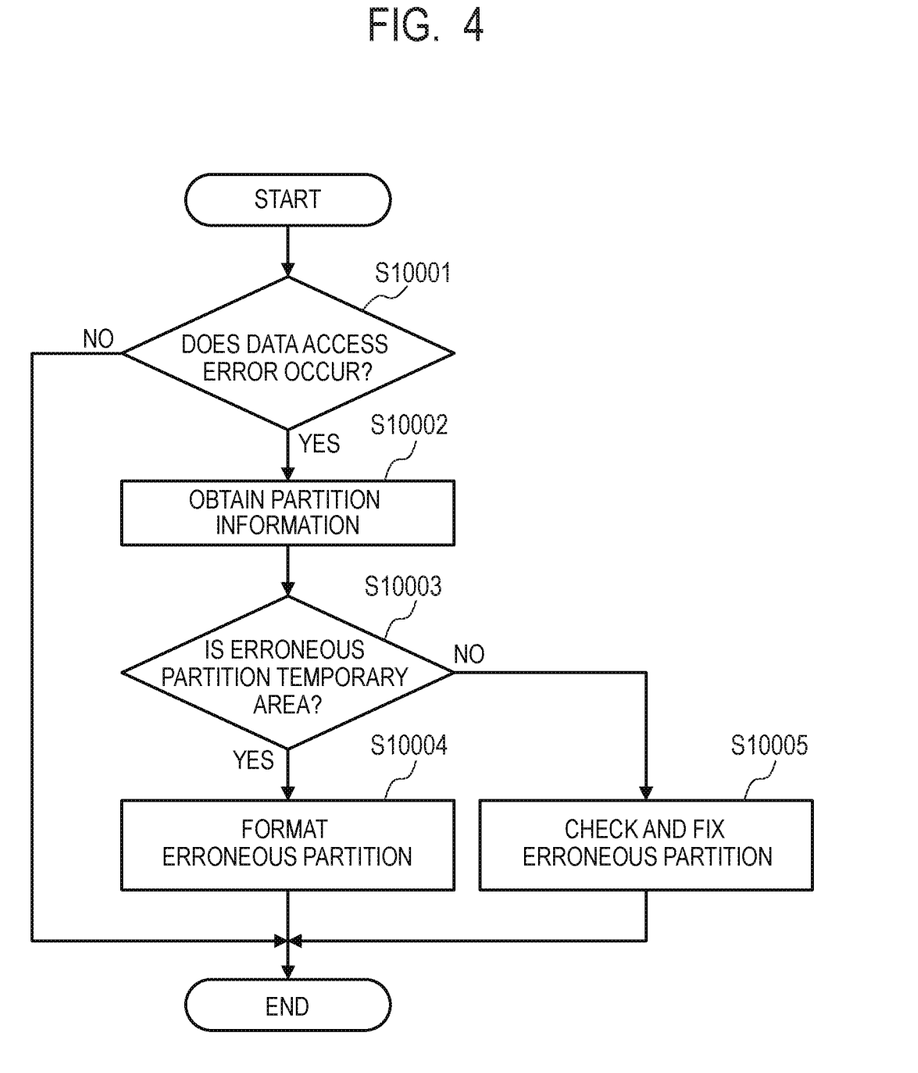
FIG. 4 is a flowchart illustrating an example of a process in the image forming apparatus in the embodiment.

FIG. 4 is a flowchart illustrating an example of a process in the image forming apparatus 1 in this embodiment. The process of this flowchart is realized by the CPU 13 in the controller 3 executing a program stored in the ROM 160. The process of this flowchart is performed when the hard disk 14 is accessed.

At step S10001, the controller 3 determines whether an abnormality (a data access error) occurs in an access to data in the hard disk 14. It is to be noted that the occurrence of a data access abnormality (a data access error) refers to the occurrence of a read error (failure to read data from the hard disk 14) or a write error (failure to write data to the hard disk 14).

If it is determined that no data access abnormality occurs (NO at S10001), the controller 3 terminates the process of this flowchart.

On the other hand, if it is determined that a data access abnormality occurs (YES at S10001), the controller 3 advances the process to step S10002.

At step S10002, the controller 3 obtains information about the partition having the data access abnormality. The partition information obtained here is the partition number and the partition label.

Then, at step S10003, the controller 3 determines whether the partition having the data access abnormality is a temporary area. In this embodiment, a table as in FIG. 3 is stored in the SRAM 40 in advance. In this table, for partitions with the use 403 set to "temporary area," the recovery action 404 is set to "format." For partitions with the use 403 not set to "temporary area," the recovery action 404 is set to "check and fix." The controller 3 identifies, as a "temporary area," a partition with the use 403 set to "temporary area."

Alternatively, the controller 3 may identify, as a "temporary area," a partition with the recovery action 404 set to "format." In the example of FIG. 3, the partition with the partition number "5" and the partition label "/TMPDATA" is identified as a "temporary area." At S10003, the controller 3 determines that the partition having the data access abnormality is a temporary area if the partition information obtained at S10002 matches the partition number "5" and the partition label "/TMPDATA." Otherwise, the controller 3 determines that the partition having the data access abnormality is not a temporary area.

If it is determined at above S10003 that the partition having the data access abnormality is a temporary area (YES at S10003), the controller 3 advances the process to step S10004.

At step S10004, the controller 3 formats the partition having the data access abnormality and terminates the process of this flowchart.

On the other hand, if it is determined at above step S10003 that the partition having the data access abnormality is not a temporary area (NO at S10003), the controller 3 advances the process to step S10005.

At step S10005, the controller 3 checks and fixes the partition having the data access abnormality and terminates the process of this flowchart.

In other words, the above control may involve having a table as in FIG. 3 in which a recovery action is preset for each partition, and, for a partition with an access abnormality detected, performing the recovery action set for the partition in the table as in FIG. 3. Thus, if the partition with the detected access abnormality has the label "/TMPDATA," the controller 3 performs the recovery action set for the partition ("format" in the example of FIG. 3). If the partition with the detected access abnormality has the label "/BOX-DATA," "/APLDATA" or "/OTRDATA," the controller 3 performs the recovery action set for the partition ("check and fix" in the example of FIG. 3).

However, the table as in FIG. 3 may not be used. In this case, the control may involve simply determining whether the partition is a temporary area, and formatting the partition if the partition is a temporary area or checking and fixing the partition if the partition is not a temporary area.

For example, if the partition label obtained at S10002 is "/TMPDATA," the controller 3 determines that the partition having the data access abnormality is a temporary area (YES at S10003) and formats the partition (S10004).

On the other hand, if the partition label obtained at S10002 is not "/TMPDATA," the controller 3 determines that the partition having the data access abnormality is not a temporary area (NO at S10003) and checks and fixes the partition (S10005). It is to be noted that although the partition label is used to determine whether the partition is a temporary area in this example, this determination may be based on the partition number or on both the partition number and the partition label. If the partition number is used, it is determined in the example of FIG. 3 that the partition is a "temporary area" if the partition number is "5," and is not a "temporary area" if the partition number is not "5."

As described above, in this embodiment, the downtime can be reduced on the occurrence of a storage-related error that may be recoverable by checking and fixing a file system. Although a hard disk, which is prone to logical failures especially due to the low vibration tolerance, has been described in this embodiment as an exemplary storage device, the storage device may be some other device such as an SSD.

The recovery action performed at steps S10004 and S10005 may be the action of saving reservation information in the SRAM 40. The reservation information causes the recovery action for the partition having the detected access abnormality to be performed upon restart of the image forming apparatus. Thus, after the image forming apparatus 1 is restarted, the reserved recovery action is performed based on the reservation information saved in the SRAM 40.

Note that the image forming apparatus 1 may have multiple storage devices. That is, the image forming apparatus 1 may have at least one storage device, such as hard disk drives and solid state drives, logically dividable into a plurality of storage areas (partitions) each capable of construction a file system. For example, the image forming apparatus 1 may have two hard disk drives and one solid state drive. Still in such a configuration, a table is provided in which the use 403 and the recovery action 404 are defined, respectively, for each partition created in the plurality of storage devices.

If an access abnormality is detected in any of the partitions in the plurality of storage devices, the controller 3 performs, for the partition with the detected access abnormality, the recovery action corresponding to the storage area type of the partition. In this manner, the recovery action is controlled according to the partition in which the access abnormality is detected. This configuration can reduce the downtime and the number of times a serviceperson is called while reducing the risk of data loss on the occurrence of a data access abnormality in the storage device. Thus, on the occurrence of a storage-related recoverable error, the downtime and the number of times a serviceperson is called can be reduced while the loss of user data is prevented.

The disclosure is applicable not only to image forming apparatuses, but is generally applicable to information processing apparatuses having storage devices as above and achieves the advantages as above.

Thus, if an abnormal access to data stored in a storage device such as an HDD is detected, a recovery action is performed according to the information about the partition where the data is located. That is, on the occurrence of a data access abnormality in an image forming apparatus, a file system is checked and fixed if the partition in question is used for non-temporary data and cannot be formatted without the user's approval. Therefore, by checking and fixing a file system for a non-temporary-data partition that cannot be formatted without the user's approval, the downtime can be reduced as much as possible.

Note that the above-described structure and content of the different types of data are not limiting, but the structure and content may vary according to the uses and purposes of the data.

While an embodiment has been described above, the disclosure can include aspects such as, for example, a system, an apparatus, a method, a program or a storage medium. Specifically, the disclosure may be applied to a system including multiple devices or to an apparatus embodied as a single device.

Combinations of the above embodiments are all included in the disclosure.

If partitions are formatted according to the use of the partitions as in Japanese Patent Application Laid-Open No. 2016-18322, only temporary-data partitions that can be formatted without the user's approval are addressed. However, a data access abnormality does not necessarily occur only in a temporary-data partition. Therefore, a data access abnormality occurring in a non-temporary-data partition cannot be addressed by automatic recovery and requires a serviceperson's on-site recovery work. By contrast, according to an aspect of the present embodiment, advantages of automatic recovery (advantages of the reduced downtime and the reduced number of times a serviceperson is called) can be achieved. Thus, a mechanism can be provided that can reduce the downtime and the number of times a serviceperson is called while reducing the risk of data loss on the occurrence of an access abnormality in a storage device.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-117603, filed Jun. 21, 2018, which is hereby incorporated by reference herein in its entirety.

What is claimed is:

1. An image forming apparatus comprising:
   at least one storage device including first and second storage areas; and
   a controller having one or more processor which executes instructions stored in one or more memory, the controller being configured to:
   format the first storage area and not format the second storage area, based on detection of an access error to the first storage area; and
   recover data of the second storage area and not recover data of the first storage area, based on detection of an access error to the second storage area.

2. The image forming apparatus according to claim 1, wherein the controller determines a type of the storage area based on a partition number of a storage area in which the access error is detected.

3. The image forming apparatus according to claim 1, wherein the controller determines a type of the storage area based on a partition label of a storage area in which the access error is detected.

4. The image forming apparatus according to claim 1, wherein the controller makes a reservation for:
   formatting the first storage area upon restart of the image forming apparatus in response to detecting the access error to the first storage area; and
   recovering the second storage area upon restart of the image forming apparatus in response to detecting the access error to the second storage area.

5. The image forming apparatus according to claim 1, wherein the access error is a read error indicative of failure to read data out from the storage device.

6. The image forming apparatus according to claim 1, wherein the access error is a write error indicative of failure to write data to the storage device.

7. The image forming apparatus according to claim 1 further comprising a scanner,
   wherein the storage device further includes a third storage area that is a partition for holding image data generated by the scanner, and
   wherein the controller is further configured to recover the third storage area based on detection of the access error to the third storage area.

8. The image forming apparatus according to claim 1, wherein the controller is further configured to recover a storage area in which the access error is detected based on detection of the access error in a storage area other than the first storage area.

9. The image forming apparatus according to claim 1, wherein the first storage area is used as a temporary area at least for decompressing the compressed image data.

10. The image forming apparatus according to claim 9, wherein the second storage area is a partition to hold an application.

11. The image forming apparatus according to claim 1, wherein the controller performs the format through a mkfs command, and the recovering through a fsck command.

12. The image forming apparatus according to claim 1, wherein the controller is configured to:
    automatically format the first storage area based on detection of an access error to the first storage area; and
    automatically recover data of the second storage area based on detection of an access error to the second storage area.

13. An image forming apparatus comprising:
    at least one storage device including first and second storage areas; and
    a controller having one or more processor which executes instructions stored in one or more memory, the controller being configured to:
    set, for the first storage area, formatting as a recovery action to be performed and not set the formatting for the second storage area if an access error is detected in the first storage area;
    set, for the second storage area, recovering as a recovery action to be performed and not set the recovering for the first storage area if an access error is detected in the second storage area; and
    performing the formatting based on detection of the access error to the first storage area; and
    performing the recovering based on detection of the access error to the storage area.

14. The image forming apparatus according to claim 13, wherein the controller is configured to:
    automatically set, for the first storage area, formatting as a recovery action to be performed if an access error is detected in the first storage area;
    automatically set, for the second storage area, recovering as a recovery action to be performed if an access error is detected in the second storage area.

15. A method for controlling an image forming apparatus comprising at least one storage device including first and second storage areas, the method comprising:
    detecting an access error to the storage device; and
    in response to detection of the access error, performing, for a storage area in which the access error is detected, a recovery action corresponding to the storage area,
    wherein the performing the recovery action includes:
    formatting the first storage area and not formatting the second storage area, based on detection of the access error to the first storage area; and
    recovering data of the second storage area and not recovering data of the first storage area, based on detection of the access error to the second storage area.

16. The method according to claim 15, further comprising determining a type of the storage area based on a partition number of a storage area in which the access error is detected.

17. The method according to claim 15, further comprising determining a type of the storage area based on a partition label of a storage area in which the access error is detected.

18. A method for controlling an image forming apparatus comprising at least one storage device including first and second storage areas, the method comprising:
    formatting the first storage area and not formatting the second storage area, based on detection of an access error to the first storage area; and
    recovering data of the second storage area and not recovering data of the first storage area, based on detection of an access error to the second storage area.

19. A method for controlling an image forming apparatus comprising at least one storage device including first and second storage areas, the method comprising:
    setting, for the first storage area formatting as a recovery action to be performed and not setting the formatting for the second storage area if an access error is detected in the first storage area;

setting, for the second storage area, recovering as a recovery action to be performed and not setting for the first storage area if an access error is detected in the second storage area; and performing the formatting based on detection of the access error to the first storage area; and performing the recovering based on detection of the access error to the second storage area.

* * * * *